No. 817,987. PATENTED APR. 17, 1906.
H. H. RICHARDSON.
FISH LINE REEL.
APPLICATION FILED AUG. 2, 1904.

Witnesses:
Fred J. Sovereign.
E. Behel.

Inventor:
Harry H. Richardson
By A. O. Behel
Atty.

UNITED STATES PATENT OFFICE.

HARRY HAMILTON RICHARDSON, OF BEAVER FALLS, PENNSYLVANIA, ASSIGNOR TO AMERICA COMPANY, OF ROCKFORD, ILLINOIS, A CORPORATION OF ILLINOIS.

FISH-LINE REEL.

No. 817,987.   Specification of Letters Patent.   Patented April 17, 1906.

Application filed August 2, 1904. Serial No. 219,231.

*To all whom it may concern:*

Be it known that I, HARRY HAMILTON RICHARDSON, a citizen of the United States, residing at Beaver Falls, in the county of Beaver and State of Pennsylvania, have invented certain new and useful Improvements in Fish-Line Reels, of which the following is a specification.

The object of this invention is to equip a reel with a line-guide which is moved back and forth during the winding of the line on the reel and which is movable at pleasure so not to interfere with the line when it is being cast or when it is being reeled in and which for convenience may be termed a "throw-out spooling device."

The further object of this invention is to allow the connection between the line-guide and the mechanism for moving it to be broken at pleasure—for instance, during the time the line is being cast—thereby allowing greater freedom to the reel.

Figure 1:
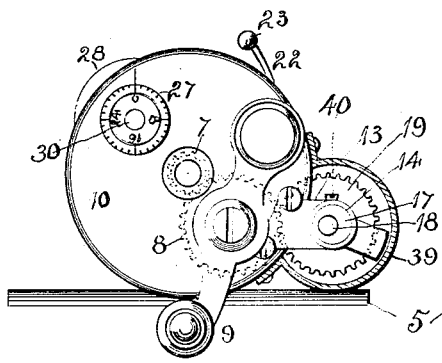
Figure 3:
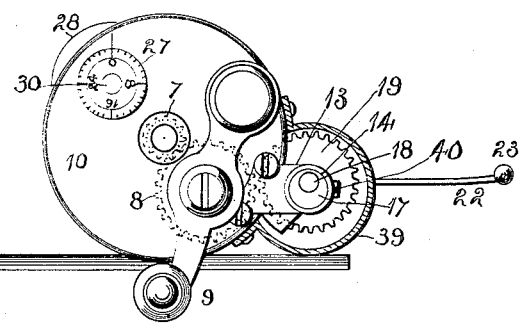
Figure 2:
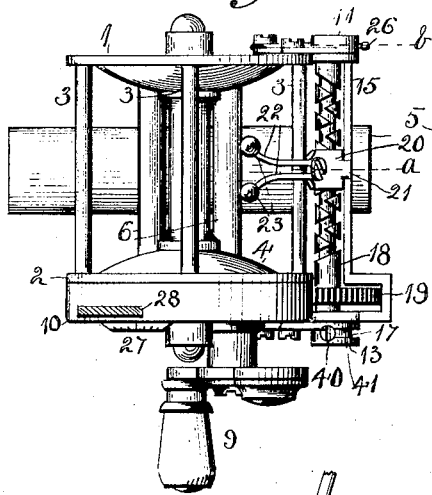
Figure 4:
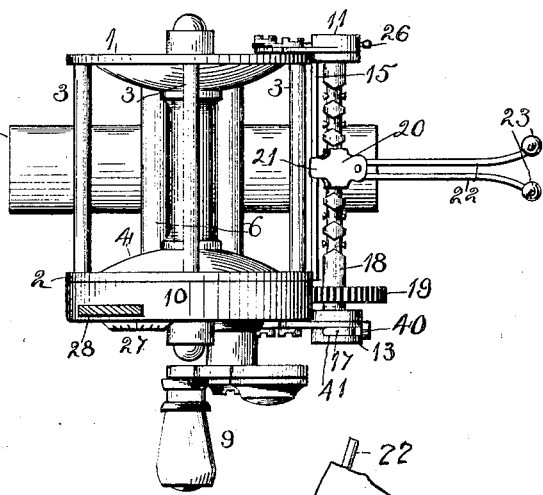
Figure 5:
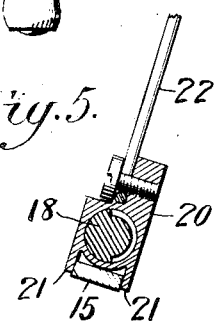
Figure 6:
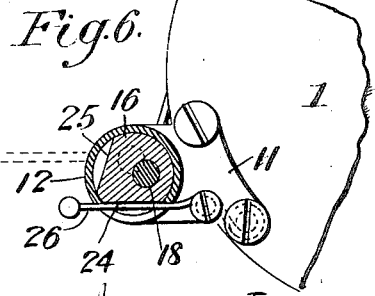

In the accompanying drawings, Figure 1 is an end elevation of my improved reel in which the line-guide is in operative position. Fig. 2 is a plan view of Fig. 1. Fig. 3 is an end elevation of the reel in which the line-guide is in inoperative position. Fig. 4 is a plan view of Fig. 3. Fig. 5 is a section on dotted line *a*, Fig. 2. Fig. 6 is a section on dotted line *b*, Fig. 2.

The heads 1 and 2 are held separated by the rods 3. The spool 4 is supported by the ends in the usual manner. The connecting-bar 5 has a connection with the rods 6. One end of the spool supports a pinion 7, and a toothed wheel 8 is supported upon a stud connected to the end 2 and meshes with the pinion. A handle 9 has a connection with the toothed wheel 8 in the usual manner. A casing or cap 10 covers the pinion 7 and toothed wheel 8. To the end 1 is secured a bracket 11, having a circular opening 12 in its free end. A bracket 13 is secured to the casing 10 and has a circular opening 14 in its free end. A frame is supported by the brackets and comprises a bar 15 and two circular ends 16 and 17, the circular ends supported in the circular openings of the brackets. Each circular end has an opening located to one side of the center of the ends. A shaft 18 is supported in the openings in the ends of the frame and is provided with right and left hand screw-threads. A toothed wheel 19 is supported by the shaft near the bracket 13 and extends through an opening in the casing and meshes with the toothed wheel 8.

A line-guide is supported by the shaft 18 and consists of two fingers 22. The fingers extend substantially parallel and have their free ends branched in fork form and each branch supporting a ball 23. The line-guide is attached to the clamp 20, provided with the usual dog engagement with the threads of the shaft, having two lugs 21 engaging the bar 15 and capable of sliding in contact therewith. In turning the handle 9 the pinion 7, connected to the spool, is rotated, also the toothed wheel 19, which in turn rotates the shaft 18, thereby moving the line-guide back and forth in the lengthwise direction of the shaft.

In reeling the line upon the spool it is located between the fingers 22, and as the fingers move back and forth in the lengthwise direction of the spool the line will be laid upon the spool in uniform courses and in such manner as to pay out freely in casting. As the shaft 18 is supported eccentrically within the ends of the frame it is evident that by rocking the frame the shaft will be moved upward and rearward, which will carry the toothed wheel 19 out of engagement with the toothed wheel 8, thereby breaking connection between the shaft and its driving means. As the fingers are connected to the clamp and the clamp supported by the shaft 18 and having a sliding engagement with the bar 15, it is clear that by moving the fingers from the position shown in Fig. 1 into the position shown in Fig. 3 the bar 15 and the ends supporting the shaft will be rocked sufficiently to break the gear connection, as above described.

The end 16 (shown in Fig. 6) is provided with two flattened surfaces 24 and 25, and a spring 26, supported by the bracket 11, will engage these surfaces as the end is rocked, thereby holding the fingers in operative or in inoperative position.

By having the ends of the fingers forked the line will more readily enter between them. When the line-guide is in a position to receive the fish-line, as in the act of laying the line on the spool, it will be in operative position, and when it is moved so that the fish-line can pay out without being guided or actively engaged by it it will be in an inoperative position, and I do not limit my invention to the specific means shown in the drawings, and I consider it within the scope of my claims if this result is accomplished in any manner.

In the drawings in Figs. 1 and 3 I have shown in section a casing 39 for the toothed wheel 19. The screw 40, located in the slot 41, limits the movement of the frame in both directions.

I claim as my invention—

1. A fish-line reel comprising a frame, a spool supported by the frame, and a line-guide supported by the frame and capable of movement to place it in an operative or in an inoperative position.

2. A fish-line reel comprising a frame, a spool supported by the frame, a line-guide supported by the frame and means for moving the line-guide back and forth in the lengthwise direction of the spool, said line-guide capable of being moved into an inoperative position.

3. A fish-line reel comprising a frame, a spool supported by the frame, a line-guide supported by the frame and means for moving the line-guide back and forth in the lengthwise direction of the spool, said line-guide capable of a movement at right angles to the length of the spool to place it in an inoperative position.

4. A fish-line reel comprising a frame, a spool supported by the frame, a line-guide supported by the frame and means for moving the line-guide back and forth in the lengthwise direction of the spool, said line-guide being pivotally supported in order that it may be moved into an inoperative position.

5. A fish-line reel comprising a frame, a spool supported by the frame, a line-guide supported by the frame and means for moving the line-guide bodily back and forth in the lengthwise direction of the spool, said line-guide capable of being moved in an inoperative position, said movement of the line-guide stopping its bodily movement.

6. A fish-line reel comprising two heads, a spool supported by the heads, gears for rotating the spool, two brackets supported by the heads, each having a circular opening, a frame having ends fitted to the openings, a shaft supported by the ends of the frame and eccentric thereto, a line-guide supported by the shaft, and a toothed wheel supported by the shaft and capable of engagement with the driving-wheel for the spool, and capable of disengagement therefrom by rocking the frame.

7. A fish-line reel having a rotatable shaft, a line-guide supported by the shaft and capable of a movement at right angles to the length of the spool, and a spring for holding the guide in operative position and in inoperative position.

HARRY HAMILTON RICHARDSON.

Witnesses:
P. J. MAGEE,
JAMES PIPER.